(12) United States Patent
Kupferman (10) Patent No.: US 7,057,836 B1
(45) Date of Patent: Jun. 6, 2006

(54) DISK DRIVE SERVO CONTROLLER UTILIZING AN EXTENDED SERVO HEADER

(75) Inventor: Hanan Kupferman, Diamond Bar, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/993,461

(22) Filed: Nov. 19, 2004

(51) Int. Cl.
*G11B 5/09* (2006.01)

(52) U.S. Cl. .................. 360/51; 360/48; 360/77.04
(58) Field of Classification Search ............... None
See application file for complete search history.

(56) References Cited

U.S. PATENT DOCUMENTS

| | | | | |
|---|---|---|---|---|
| 4,745,587 A | * | 5/1988 | Maeda et al. ............. | 369/30.27 |
| 5,297,131 A | * | 3/1994 | Tanaka ..................... | 369/275.2 |
| 5,905,705 A | * | 5/1999 | Takeda et al. ............. | 360/51 |
| 5,917,668 A | * | 6/1999 | Behrens et al. ............ | 360/51 |
| 6,002,540 A | * | 12/1999 | Cunningham et al. ... | 360/77.04 |
| 6,108,153 A | * | 8/2000 | Glover ...................... | 360/51 |
| 6,144,517 A | * | 11/2000 | Watanabe et al. ......... | 360/77.04 |
| 6,233,107 B1 | * | 5/2001 | Minuhin ..................... | 360/51 |
| 6,304,407 B1 | * | 10/2001 | Baker et al. ............... | 360/75 |
| 6,515,813 B1 | * | 2/2003 | Kitazaki et al. ............ | 360/51 |
| 6,657,810 B1 | * | 12/2003 | Kupferman ............... | 360/77.04 |
| 6,738,205 B1 | * | 5/2004 | Moran et al. ............. | 360/17 |
| 6,785,075 B1 | * | 8/2004 | Bryant et al. ............. | 360/51 |
| 6,882,487 B1 | * | 4/2005 | Hanson et al. ............ | 360/51 |
| 6,891,693 B1 | * | 5/2005 | Shibata ..................... | 360/77.04 |
| 6,898,035 B1 | * | 5/2005 | Chainer et al. ............ | 360/51 |
| 6,972,540 B1 | * | 12/2005 | Wang et al. ............... | 318/650 |
| 7,012,778 B1 | * | 3/2006 | Shigematsu .............. | 360/77.04 |
| 2001/0010604 A1 | * | 8/2001 | Esumi ........................ | 360/49 |

* cited by examiner

*Primary Examiner*—Wayne Young
*Assistant Examiner*—Dismery Mercedes
(74) *Attorney, Agent, or Firm*—Blakely Sokoloff Taylor & Zafman (57) ABSTRACT

A disk drive includes a moveable head and a disk having a circumferential track which includes a plurality of servo wedges. The servo wedges are spaced sequentially around a circumference of the circumferential track. Each servo wedge includes an extended servo header. The disk drive includes a servo controller to perform track following with the moveable head. The servo controller compensates for servo wedge timing errors due to eccentricity associated with the servo wedges of the circumferential track by implementing: a first mode in which the servo controller locks to the extended servo header of a servo wedge and performs servo wedge timing error learning to characterize servo wedge timing errors and a second mode to adapt servo control signals of the servo controller based on the characterized servo wedge timing errors of the first mode in order to dynamically compensate for the eccentricity associated with the servo wedges.

12 Claims, 6 Drawing Sheets

DISK DRIVE SERVO CONTROLLER UTILIZING AN EXTENDED SERVO HEADER

BACKGROUND OF THE INVENTION

1. Field of the Invention

The present invention relates to disk drives. More particularly, the present invention relates to a disk drive servo controller that utilizes an extended servo header.

2. Description of the Prior Art and Related Information

Computer systems often rely on disk drives for storing and retrieving data. Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable transducer head for reading and writing data. The HSA forms part of a servo control system that positions the moveable transducer head over a particular track on the disk to read or write information from and to that track, respectively.

Typically, a conventional hard disk drive includes a disk having a plurality of concentric tracks. Each surface of each disk conventionally contains a plurality of concentric data tracks angularly divided into a plurality of data sectors. In addition, special servo information may be provided on each disk to determine the position of the moveable transducer head.

The most popular form of servo is called "embedded servo" wherein the servo information is written in a plurality of servo wedges that are angularly spaced from one another and are interspersed between data sectors around each track of each disk.

Each servo wedge typically includes a phase lock loop (PLL) field, a servo synch mark (SSM) field, a track identification (TKID), a wedge ID field having a binary encoded wedge ID number to identify the wedge, and a group of servo bursts (e.g. an alternating pattern of magnetic transitions) which the servo control system samples to align the moveable transducer head with or relative to a particular track.

Typically, the servo control system moves the transducer head toward a desired track during a course "seek" mode using the TKID field as a control input. However, in processing information, it is necessary to ensure consistency in the detection of bits composing a block of bits. One common approach directed to ensuring such consistency employs multiple stored fields including a phase lock loop (PLL) field to facilitate bit synchronization and a synch field to facilitate block synchronization. The synch mark field facilitates block synchronization by holding a special marker that is detected to "frame" data, i.e. to identify a boundary of a block. In contemporary hard disk drives, employing embedded servos, it is well known to provide framing of servo data via a servo synch mark (SSM) field. For example, in hard disk drives, a servo synchronization signal based on the moveable transducer head reading a servo synchronization mark (SSM) results in a read/write channel of the disk drive establishing a precise timing reference point for read/write operations.

Once the moveable transducer head is generally over the desired track, the servo control system uses the servo bursts to keep the moveable transducer head over that track in a fine "track follow" mode. During track following mode, the moveable transducer head repeatedly reads the wedge ID field of each successive servo wedge to obtain the binary encoded wedge ID number that identifies each wedge of the track. In this way, the servo control system continuously knows where the moveable transducer head is relative to the disk.

A feature referred to as disk synchronous write (DSW) is known. DSW is a feature that learns timing errors between servo wedges (e.g. SSM to SSM), and position error signals (PESs), and based on those learned timing errors, adapts the timing of the servo control signals (e.g. via frequency control) for use in the opening and closing of timing windows for the read/write channel for use in disk drive operations. For example, DSW may be employed in the reading of servo data and in the reading and writing of user data. By utilizing DSW, better efficiencies can be realized even in view of timing uncertainties due to disturbances such as eccentricity associated with the rotating disk.

In order to reduce timing uncertainties and to increase efficiencies, servo control systems may employ DSW. Particularly, DSW as currently employed, follows speed variations of the read servo data, and position error signals (PESs), and modifies timing control signals of the servo control system and of the read/write channel.

Eccentricity associated with a rotating disk drive, which results in associated eccentricity of read servo wedges upon which the servo control system operates, may occur for a number of reasons. When a disk is servo-written by a media writer and mounted in the HDA, it may not be properly aligned resulting in eccentricity associated with the rotating disk. Additionally, the disk drive may be dropped or be subjected to some sort of operational shock, which further adds to eccentricity problems. For all of these reasons, the disk may not be at the center of rotation resulting in the disk and the servo wedges turning with eccentricity.

When this occurs, the servo wedges appear to the servo control system as if they are not evenly spaced such that timing uncertainties are introduced thereby causing problems in both the reading and writing of data. Typically, the servo wedge timing of the eccentric disk is modulated by a once-around (i.e., a disturbance that occurs with every revolution). Accordingly, the eccentricity associated with the servo wedges results in timing uncertainties being introduced into the servo control system such that resultant servo control signals to control the writing of data also include these timing errors.

Unfortunately, present-day servo control systems before implementing DSW, when confronted with eccentricity problems, may often take a long time and be very inefficient in locking onto the servo header and implementing DSW, or may never lock onto the servo header resulting in the failure of the disk drive.

SUMMARY OF THE INVENTION

Embodiments of the present invention relate to a disk drive servo controller that utilizes an extended servo header.

In one aspect, the invention may be regarded as a disk drive including a moveable head and a disk having a circumferential track. The circumferential track includes a plurality of servo wedges utilized in track following. The plurality of servo wedges is spaced sequentially around a circumference of the circumferential track. Each servo wedge includes an extended servo header. The disk drive includes a servo controller to perform track following with the moveable head. The servo controller compensates for servo wedge timing errors due to eccentricity associated with the servo wedges of the circumferential track by implementing: a first mode in which the servo controller locks to the extended servo header of a servo wedge and performs servo wedge timing error learning to characterize servo wedge timing errors and a second mode to adapt servo control signals of the servo controller based on the characterized servo wedge timing errors of the first mode in order to compensate for the eccentricity associated with the servo wedges.

In one embodiment, the extended servo header may include an extended phase lock loop (PLL) field. For example, the extended PLL field may be approximately 50% larger than a typical non-extended PLL field. Further, the extended PLL field may be approximately sized to take into account an amount of time that a pre-amplifier of the disk drive requires to recover from a previous write operation.

In one embodiment, in the first mode, the servo controller sets a servo-gate open signal through a read/write channel to an extended time period in order to detect and lock on to the extended servo header. In the second mode, the servo controller sets a servo-gate open signal through the read/write channel to a normal time period as utilized for adaptive read/write operations in the disk drive.

In a further aspect, the invention may be regarded as a method to compensate for servo wedge timing errors in a disk drive due to eccentricity associated with the servo wedges of a circumferential track. The disk drive includes a disk having a circumferential track in which the circumferential track includes a plurality of servo wedges utilized in track following. Each of the plurality of servo wedges includes an extended servo header and the plurality of servo wedges are spaced sequentially around the circumference of the circumferential track.

The method to compensate for servo wedge timing errors due to eccentricity associated with the servo wedges of a circumferential track includes locking to an extended servo header and performing servo wedge timing error learning to characterize servo wedge timing errors as part of a first mode and compensating for eccentricity associated with the servo wedges based on adapting servo control signals of the servo controller as part of a second mode based on the characterized servo wedge timing errors.

The foregoing and other features of the invention are described in detail in the Detailed Description and are set forth in the appended claims.

DETAILED DESCRIPTION

Figure 1:
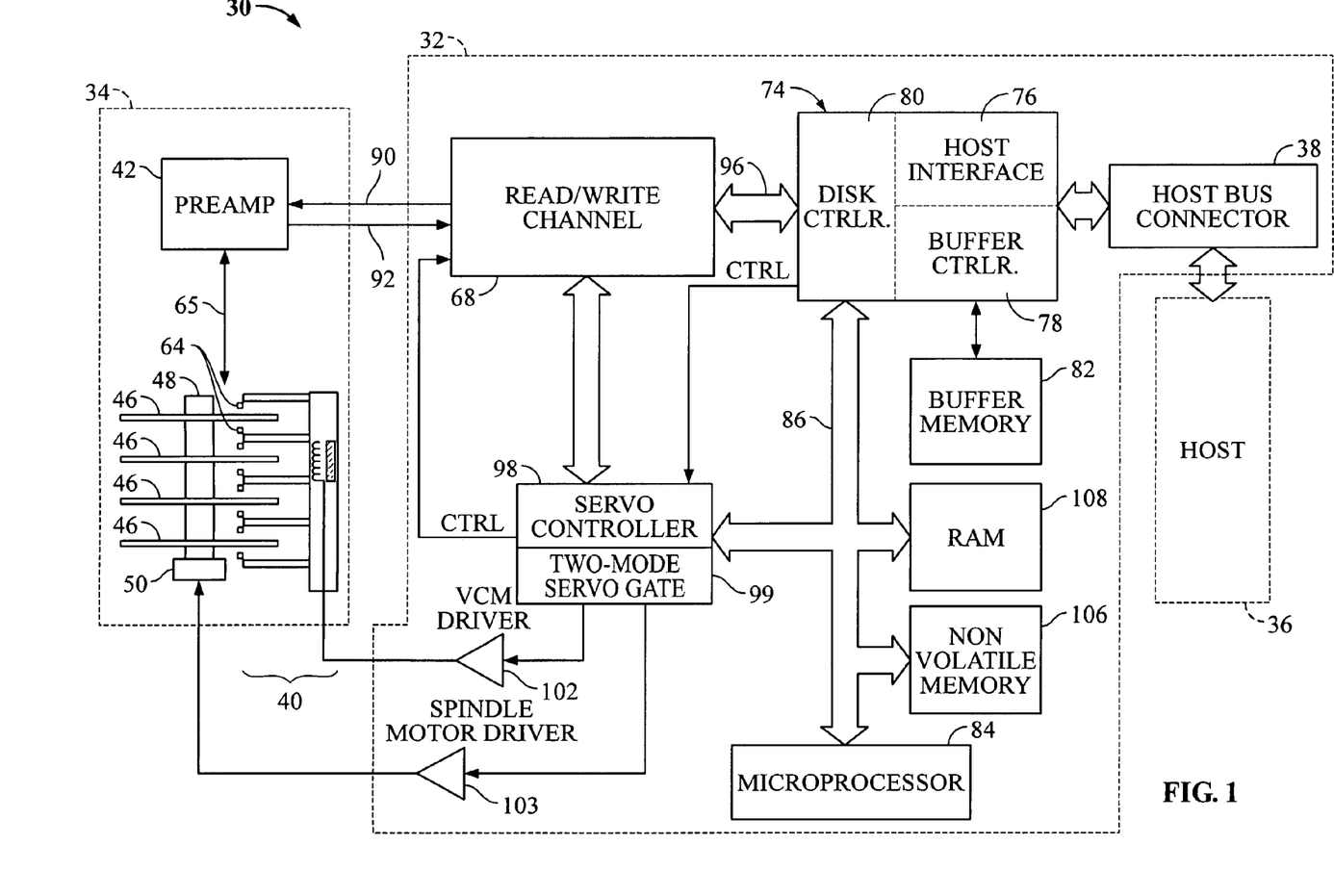
FIG. 1 shows a block diagram of disk drive, in which embodiments of the invention may be practiced.

FIG. 1 shows a block diagram of disk drive 30, in which embodiments of the invention may be practiced. One suitable standard for such connection is the Advance Technology Attachment (ATA) standard presently favored for desktop personal computers. Disk drive 30 comprises a Head/Disk Assembly, HDA 34, and a controller printed circuit board assembly, PCBA 32.

The HDA 34 comprises: one or more disks 46 for data storage; a spindle motor 50 for rapidly spinning each disk 46 (four shown) on a spindle 48; and an actuator assembly 40 for moving a plurality of heads 64 in unison over each disk 46. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 comprises a read/write channel 68, servo controller 98, host interface and disk controller HIDC 74, voice coil motor driver VCM 102, spindle motor driver SMD 103, microprocessor 84, and several memory arrays—buffer or cache memory 82, RAM 108, and non-volatile memory 106.

Servo controller 98 may operate under the control of a program or routine, such as two-mode servo gate program 99, to execute methods or processes in accordance with embodiments of the invention. These embodiments relate to implementing a two-mode servo gate methodology in conjunction with an extended servo header to compensate for servo wedge timing errors for use in disk drive operations, as will be discussed. Further, microprocessor 84 may pre-program the servo controller 98 and/or initialize the servo controller with initial and operational values for use in implementing the two-mode servo gate methodology to compensate for servo wedge timing errors.

Host initiated operations for reading and writing data in disk drive 30 are executed under control of microprocessor 84 connected to the controllers and memory arrays via a bus 86. Program code executed by microprocessor 84 is stored in non-volatile memory 106 and random access memory RAM 108. Program overlay code stored on reserved tracks of disks 46 may also be loaded into RAM 108 as required for execution.

During disk read and write operations, data transferred by preamplifier 42 is encoded and decoded by read/write channel 68. During read operations, channel 68 decodes data into digital bits transferred on an NRZ bus 96 to HIDC 74. During write operations, HIDC provides digital data over the NRZ bus to channel 68 which encodes the data prior to its transmittal to preamplifier 42. Preferably, channel 68 employs PRML (partial response maximum likelihood) coding techniques, although the invention may be practiced with equal advantage using other coding processes.

HIDC 74 comprises a disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

The servo controller 98 provides an interface between microprocessor 84 and actuator assembly 40 and spindle motor 50. Microprocessor 84 commands logic in servo controller 98 to position actuator 40 using a VCM driver 102 and to precisely control the rotation of spindle motor 50 with a spindle motor driver 103.

Preferably, disk drive 30 employs a sampled servo system in which equally spaced servo wedge sectors (termed "servo wedges") are recorded on each track of each disk 46. Data sectors are recorded in the intervals between servo sectors on each track. Servo sectors are sampled at regular intervals to provide servo position information to microprocessor 84. Servo sectors are received by channel 68, and are processed by servo controller 98 to provide position information to microprocessor 84 via bus 86. Further, as previously discussed, servo controller 98 may operate under the control of a program or routine, such as two-mode servo gate program 99 to execute methods or processes in accordance with embodiments of the invention related to implementing a two-mode servo gate method in conjunction with an extended servo header to compensate for servo wedge timing errors for use in disk drive operations, as will be discussed.

Figure 2:
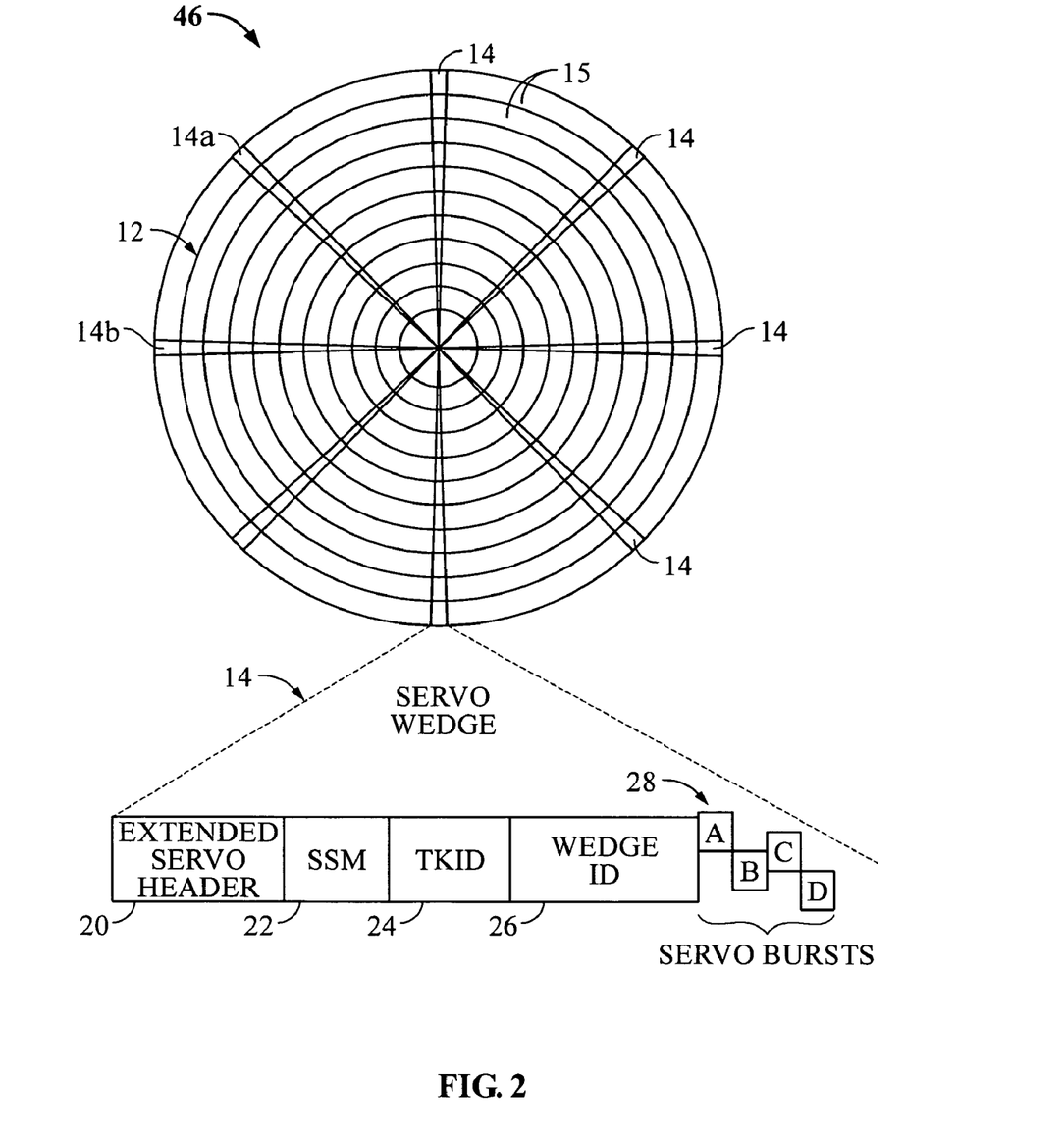
FIG. 2 shows a disk of a disk drive having a plurality of concentric tracks, and more particularly, illustrates an extended servo header.

With reference also to FIG. 2, FIG. 2 shows a disk 46 of a disk drive having a plurality of concentric tracks, and more particularly, illustrates an extended servo header 20. The disk 46 includes a plurality of concentric circumferential tracks 12. Each circumferential track 12 includes a plurality of embedded servo wedges 14 utilized in track following. The pluralities of servo wedges 14 are spaced sequentially around a circumference of the circumferential track 12. For example, the embedded servo wedges 14a, 14b, etc., contain servo information utilized in track following and are interspersed between data regions 15 of the disk 46. Data is conventionally written in the data regions 15 in a plurality of discrete data sectors. Each data region 15 is typically preceded by a servo wedge 14.

Each servo wedge 14 includes an extended servo header 20, which, in one embodiment may include an extended phase lock loop (PLL) field, a servo synch mark (SSM) field 22, a track identification (TKID) field 24, a wedge identifier (ID) 26, and a group of servo bursts (e.g. ABCD) 28 (e.g. an alternating pattern of magnetic transitions) that the servo control system samples to align the moveable transducer head with, and relative to, a particular track.

Typically, the servo controller 98 moves the transducer head 64 toward a desired track during a coarse "seek" mode using the TKID field 24 as a control input. However, in processing information, it is necessary to ensure consistency in the detection of bits composing a block of bits. In order to ensure such consistency, the extended phase lock loop (PLL) field 20 is first read in order to facilitate bit synchronization. Next, the servo synch mark 22 is read to facilitate block synchronization. The SSM 22 facilitates block synchronization by acting as a special marker that is detected to "frame" data, i.e., to identify a boundary of a block. A valid servo synchronization signal results in the read/write channel 68 of the disk drive 30 establishing a precise timing reference point for read/write operations. It is well known to provide framing of servo data via a SSM 22. The wedge ID 26 is a binary encoded wedge ID number to identify the wedge.

Further, it should be noted that once the transducer head 64 is generally over a desired track 12, the servo controller 98 uses the servo bursts (e.g. ABCD) 28 to keep the transducer head 64 over the track in a fine "track follow" mode. During track following mode, the moveable transducer head 64 repeatedly reads the wedge ID 26 of each successive servo wedge to obtain the binary encoded wedge ID number that identifies each wedge of the track. In this way, the servo controller 98 continuously knows where the head 64 is relative to the disk 46.

More particularly, the extended servo header 20 may include an extended (PLL) field. For example, the extended PLL field 20 may be approximately 50% larger than a typical non-extended PLL field. As an example, a typical PLL field may require 36 cycles to be read whereas an exemplary extended PLL field 20 may be sized to take 56 cycles to be read.

Further, the extended PLL field 20 may be approximately sized to take into account an amount of time that the preamplifier (e.g. preamplifier 42 of exemplary disk drive 30) may require to recover from a previous write operation. Currently, in typical disk drives, the space that the extended PLL field 20 may be written into is currently unused due to the fact that the preamplifier requires a set amount of time to recover after a write operation. For example, this amount of time has been calculated to be around 100 to 400 microseconds. This recovery time is presently allocated for in typical disk formats as being un-used, and occurs just before the servo wedge 14. Thus, embodiments of the invention take advantage of this unused space to provide an extended PLL field 20. As will be discussed, this allows for the servo gate signal to be set very wide to better achieve a lock even when there is a large amount of eccentricity associated with the rotating servo wedges.

Figure 3:
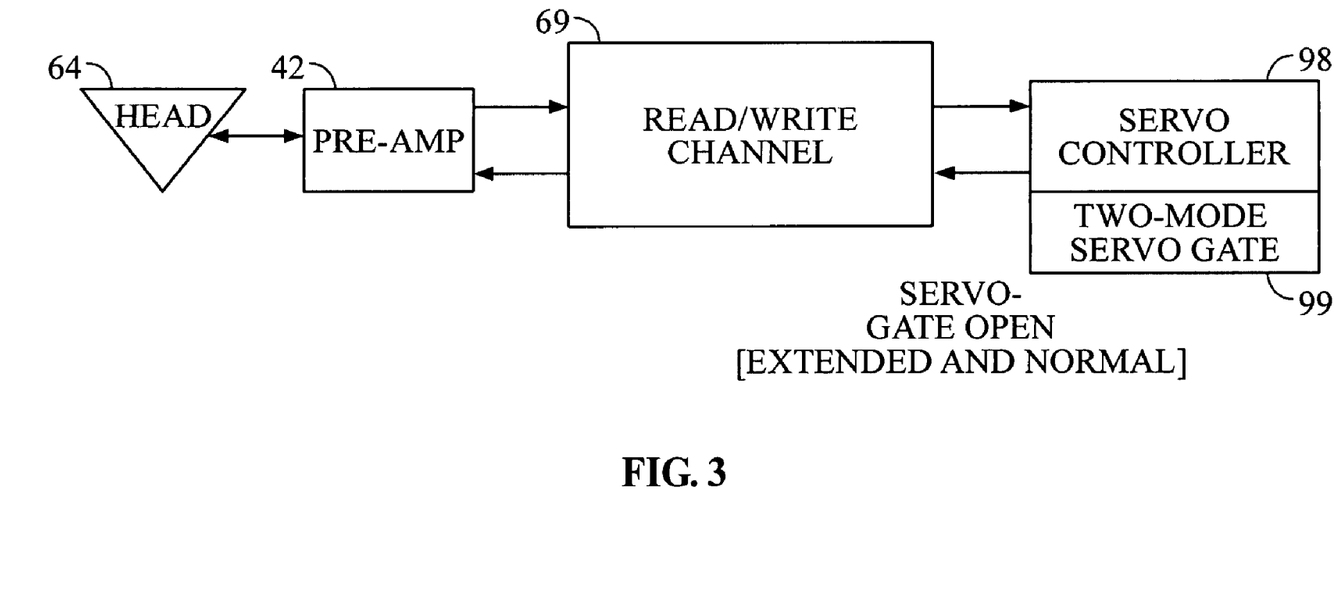
FIG. 3 illustrates a simplified example of some of the components of the previously described disk drive that are relevant to the description of the implementation of the disk drive servo controller that implements the two-mode servo gate methodology.

Turning now to FIG. 3, FIG. 3 illustrates a simplified example of some of the components of the previously described disk drive 30 that are relevant to the description of the implementation of the disk drive servo controller. Embodiments of the servo controller implement the two-mode servo gate methodology in conjunction with an extended servo header to compensate for servo wedge timing errors due to eccentricity associated with the servo wedges of a circumferential track of a disk.

As previously discussed, the servo controller 98 samples servo wedges at regular intervals to provide servo position information. Servo wedges are read by head 64, amplified by pre-amplifier 42, are received by read/write channel 69, and are processed by servo controller 98. Further, as previously discussed, servo controller 98 may operate under the control of a program or routine, such as a two-mode servo gate program 99 to execute methods or processes in accordance with embodiments of the invention. Embodiments of the invention relate to implementing a two-mode servo gate method in conjunction with the extended servo header 20 having an extended PLL for use in compensating for servo wedge timing errors due to eccentricity associated with the servo wedges of the rotating disk. As discussed, the servo controller 98 performs track following with the moveable head 64.

More particularly, the disk drive utilizing servo controller 98 and two-mode servo gate program 99 compensates for servo wedge timing errors due to eccentricity associated with the servo wedges of a circumferential track of a disk by implementing a first mode in which the servo controller 98 locks to the extended PLL of the extended servo header of a servo wedge and performs servo wedge timing error learning to characterize servo wedge timing errors and associated position error signals (PESs). The servo controller 98 further implements a second mode in which the characterized servo wedge timing errors and PESs are utilized to adapt servo control signals of the servo controller (e.g. via frequency control) in order to compensate for eccentricity associated with the servo wedges.

In one embodiment, in the first mode, the servo controller 98 sets a servo-gate open signal through the read/write channel 69 for an extended time period in order to detect and lock onto the extended PLL of the extended servo header. In the second mode, the servo controller 98 sets a servo-gate open signal through the read/write channel 69 to a normal time period as utilized for adaptive read/write operations in the disk drive and compensates for servo wedge timing errors. The second mode may incorporate standard DSW processing.

Figure 4:
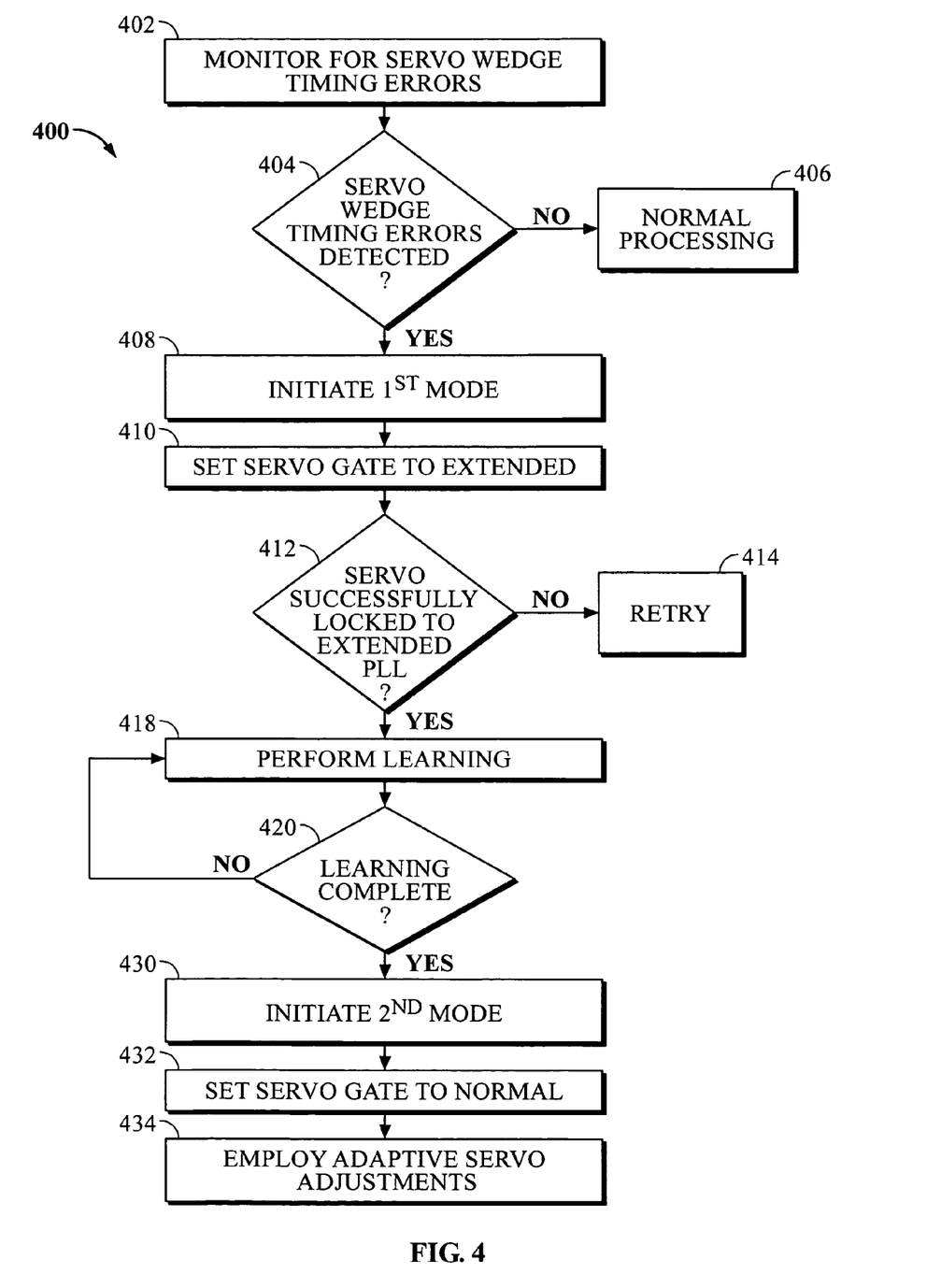
FIG. 4 is a flow chart of a method for implementing the two-mode servo gate methodology in conjunction with an extended PLL to compensate for servo wedge timing errors.

Now turning to FIG. 4, FIG. 4 is a flow chart of a method 400 for implementing the two-mode servo gate methodology in conjunction with an extended PLL to compensate for servo wedge timing errors. As will be discussed, this method provides two different modes of servo control stores and servo gate timing. Particularly, a first mode is provided for locking and learning and a second mode is then employed to implement the adaptive servo adjustments.

As step 402, the servo controller monitors for servo wedge timing errors, which, as previously discussed, may be associated with the eccentricity of the rotating disk. At step 404, if the servo controller does not detect significant servo wedge timing errors, then normal processing at block 406 occurs including normal seeking and tracking functions.

However, if servo wedge timing errors are detected, then at step 408, the servo controller initiates a first mode in which the servo controller locks on to the extended servo PLL of the extended servo header of a servo wedge and performs servo wedge timing error learning (e.g. SSM to SSM) and to position error signal (PES) learning to characterize the servo wedge timing errors. Particularly, at step 410, the servo controller sets the servo gate to an extended time period to increase the likelihood that servo controller will detect and lock onto the extended servo PLL.

At step 412, it is next determined whether the servo controller has successfully locked to the extended PLL. If not, at step 414, the servo controller retries and continuously tries to lock onto the extended servo PLL with the extended servo gate and an extension window. When the servo controller successfully locks on to an extended PLL, then servo wedge timing error and PES learning is performed to characterize the servo wedge timing errors (step 418). For example, this may be similar to typical DSW learning. As previously discussed, after the servo wedge timing errors have been characterized, the second mode is employed by the servo controller to adapt servo control signals of the servo controller (e.g. via frequency control) to compensate for these servo wedge timing errors for the proper reading and writing of user data.

As shown in block 420, the servo controller continues performing learning until learning is complete. Once learning is complete, then the servo controller at block 430 initiates the second mode in which the characterized servo wedge timing errors of the first mode are utilized by the servo controller to adapt servo control signals (e.g. via frequency control) to compensate for eccentricity associated with the servo wedges of the rotating disk. Further, as previously discussed, this second mode may implement standard DSW adaptation techniques.

Figure 5:
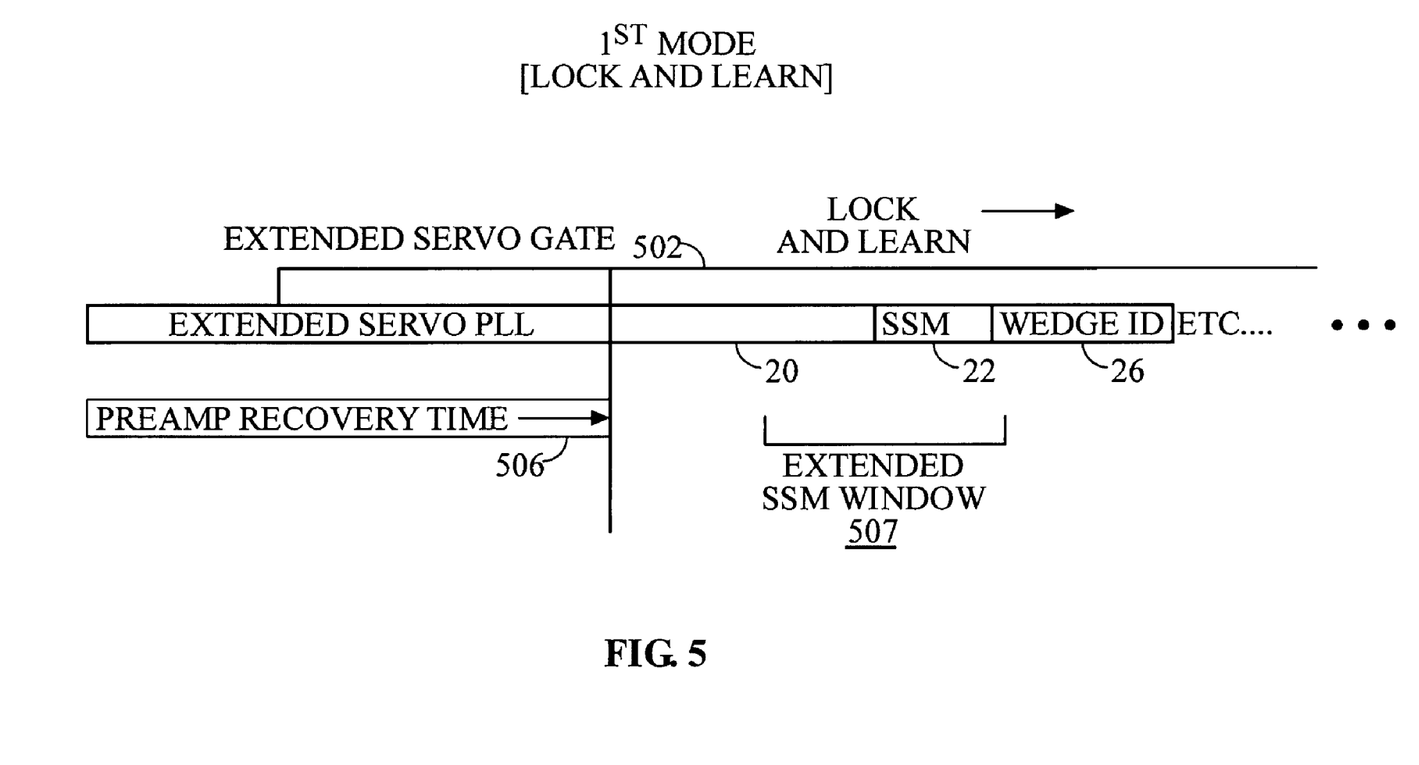
FIG. 5 is a diagram illustrating an example of the first mode in which locking and learning takes place.

Briefly looking at FIG. 5, FIG. 5 is a diagram illustrating an example of the first mode in which locking and learning takes place. Particularly, as shown in FIG. 5, the servo controller sets an extended servo gate open signal 502 through the read/write channel to an extended time period in order to detect and lock onto the extended servo PLL 20. It should be noted that the extended servo PLL 20, as previously discussed, is approximately sized to take into account an amount of time 506 that a preamplifier of the disk drive requires to recover from a previous write operation. Utilizing these extended servo gates 502 and extended servo PLLs 20 in the first mode, the servo controller can perform locking and learning functionality in a very effective fashion. Further, the servo controller may set an extended SSM window 507 through the read/write channel to an extended time period in order to detect and lock on to the SSM 22.

By the servo controller setting the extended servo gate 502 to be wide in conjunction with the extended servo PLL 20, the chances that the servo controller can lock and perform learning is greatly increased over prior implementations. More particularly, by utilizing an extended servo gate 502 and an extended servo PLL 20 the servo control system can compensate for large amounts of eccentricity associated with the servo wedges due to media writing errors, improper alignment, disk slippage, thermal expansion, disks being misaligned due to operational shock, etc. All of these, as previously discussed, can contribute to eccentricity problems.

Returning to FIG. 4, at step 420 of FIG. 4, once the servo controller has completed first mode learning, then at step 430, the second mode, in which the characterized servo wedge timing errors and PESs are utilized to adapt servo control signals of the servo controller (e.g. via frequency control) in order to compensate for the eccentricity associated with the servo wedges, is initiated. In the second mode, the servo gate is set back to normal (step 423) through the read/write channel and the servo adjustments are dynamically employed (step 434) to compensate for the eccentricity associated with the servo wedges such that data can be properly read and written to and from the disk. For example, this second mode may implement standard DSW techniques.

Figure 6:
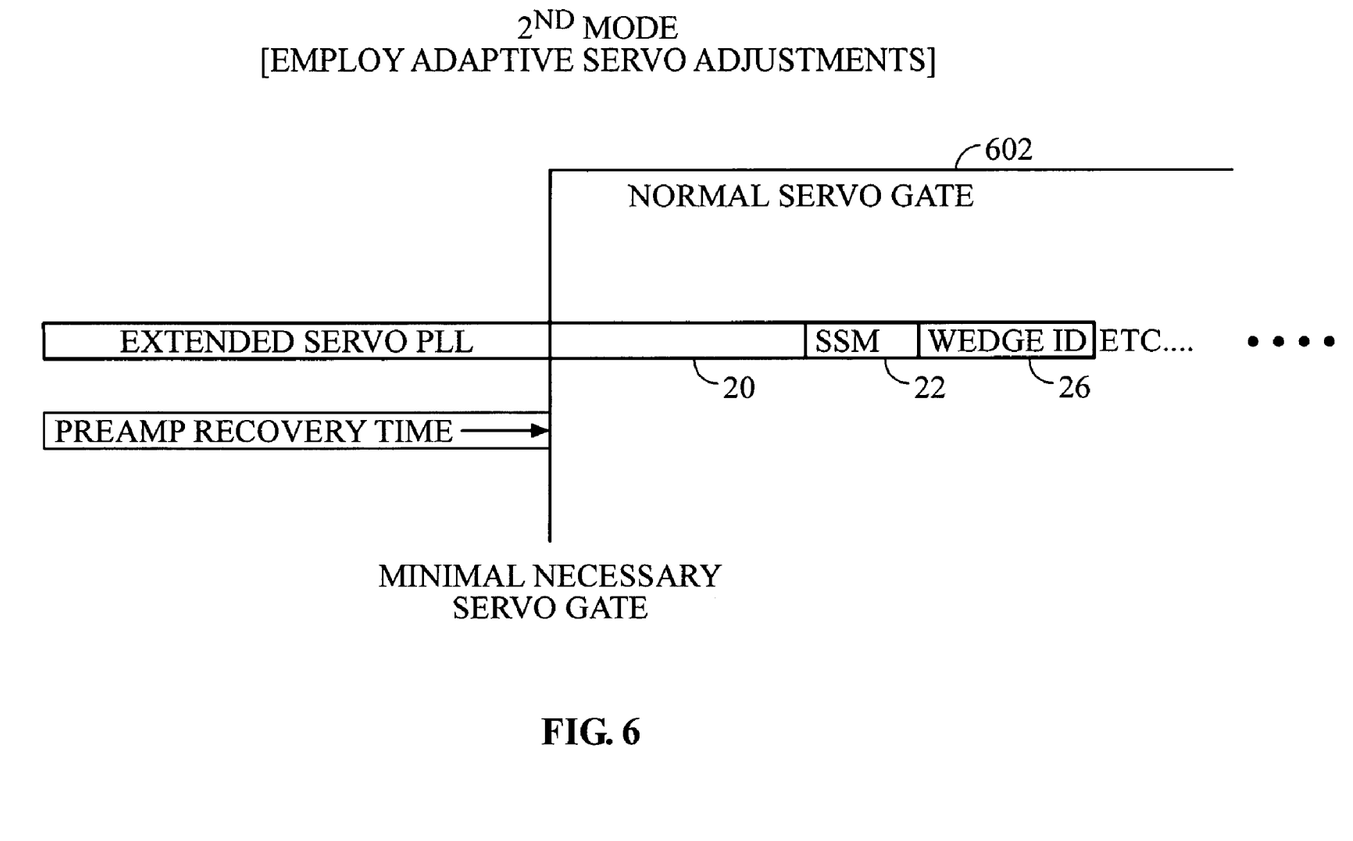
FIG. 6 is a diagram illustrating an example of the second mode in which adaptive servo adjustments may be employed.

With reference to FIG. 6, FIG. 6 is a diagram illustrating an example of the second mode in which adaptive servo adjustments may be employed. Of particular note, as shown in FIG. 6, the normal servo gate 602 is set back to a non-extended or normal mode for use in reading the extended PLL 20, SSM 22, wedge ID 26, etc., since the eccentricity associated with the servo wedge timing errors has already been characterized and compensated for. Thus, in the second mode, for example, with standard DSW processing employed, the servo controller via adaptive servo control signals compensates for the eccentricity associated with the servo wedges such that data can be properly read and written to the disk media.

By utilizing a first mode having an extended servo gate and an extended servo PLL, a great deal of speed and frequency variations associated with servo wedges being rotated in an excessively eccentric manner can still be accommodated for such that the servo controller can still be lock onto the servo wedges and such that learning can still be accomplished. In the second mode, once learning has been accomplished, the servo controller can switch back to a narrower servo gate and perform standard servo adaptation techniques and perform typical read and write operations with the eccentricity of the disk drive being accounted for.

The methods previously discussed can be employed for disk drives with an embedded servo system. However, numerous alternatives for disk drives with similar or other media format characteristics can be employed by those skilled in the art to use the invention with equal advantage to implement these improved techniques. Further, although the embodiments have been described in the context of a disk drive with embedded servo sectors, the invention can be employed in many different types of disk drives having a head actuator that scans the media.

I claim:

1. A disk drive comprising:

a moveable head;

a disk having a circumferential track, the circumferential track having a plurality of servo wedges utilized in track following, the plurality of servo wedges each including an extended servo header, the plurality of servo wedges being spaced sequentially around a circumference of the circumferential track; and a servo controller to perform track following with the moveable head, the servo controller to compensate for servo wedge timing errors due to eccentricity associated with the servo wedges of the circumferential track by implementing;

a first mode in which the servo controller locks to the extended servo header of a servo wedge and performs servo wedge timing error learning to characterize servo wedge timing errors; and a second mode to adapt servo control signals of the servo controller based on the characterized servo wedge timing errors of the first mode in order to compensate for the eccentricity associated with the servo wedges.

2. The disk drive of claim 1, wherein the extended servo header includes an extended phase lock loop (PLL) field.

3. The disk drive of claim 2, wherein the extended PLL field is approximately 50% larger than a non-extended PLL field.

4. The disk drive of claim 2, wherein the extended PLL field is approximately sized to take into account an amount of time a pre-amplifier of the disk drive requires to recover from a previous write operation.

5. The disk drive of claim 1, wherein, in the first mode, the servo controller sets a servo-gate open signal through a read/write channel to an extended time period in order to detect and lock on to the extended servo header.

6. The disk drive of claim 5, wherein, in the second mode, the servo controller sets a servo-gate open signal through a read/write channel to a normal time period as utilized for adaptive read/write operations in the disk drive.

7. In a disk drive including a disk having a circumferential track, the circumferential track having a plurality of servo wedges utilized in track following, the plurality of servo wedges each including an extended servo header, the plurality of servo wedges being spaced sequentially around a circumference of the circumferential track, a method to compensate for servo wedge timing errors due to eccentricity associated with the servo wedges of a circumferential track comprising:

locking to an extended servo header and performing servo wedge timing error learning to characterize servo wedge timing errors as part of a first mode; and compensating for the eccentricity associated with the servo wedges based on adapting servo control signals of the servo controller as part of a second mode based on the characterized servo wedge timing errors.

8. The method of claim 7, wherein the extended servo header includes an extended phase lock loop (PLL) field.

9. The method of claim 8, wherein the extended PLL field is approximately 50% larger than a non-extended PLL field.

10. The method of claim 8, wherein the extended PLL field is approximately sized to take into account an amount of time a pre-amplifier of the disk drive requires to recover from a previous write operation.

11. The method of claim 7, wherein, in the first mode, further comprising setting a servo-gate open signal to an extended time period in order to detect and lock on to the extended servo header.

12. The method of claim 11, wherein, in the second mode, further comprising setting a servo-gate open signal to a adaptive time period as utilized for normal read/write operations in the disk drive.

\* \* \* \* \*